United States Patent [19]

Mitchell

[11] Patent Number: 4,470,003

[45] Date of Patent: Sep. 4, 1984

[54] VOLTAGE REGULATOR WITH TEMPERATURE RESPONSIVE CIRCUITRY FOR REDUCING ALTERNATOR OUTPUT CURRENT

[75] Inventor: Clair E. Mitchell, Detroit, Mich.

[73] Assignee: Ford Motor Company, Dearborn, Mich.

[21] Appl. No.: 483,466

[22] Filed: Apr. 11, 1983

[51] Int. Cl.³ .......................... H02J 7/14; H02P 9/30
[52] U.S. Cl. ...................................... 322/23; 320/64; 322/28; 322/33
[58] Field of Search .................... 322/18, 35, 28, 81, 322/99; 320/35, 36, 64; 361/20

[56] References Cited

U.S. PATENT DOCUMENTS

| T938,011 | 9/1975 | Itoh et al. | 322/28 |
| 3,673,489 | 6/1972 | Riff | 322/28 |
| 3,683,259 | 8/1972 | Allport | 320/68 |
| 3,982,163 | 9/1976 | Hill | 318/473 |
| 4,100,475 | 7/1978 | Gansert et al. | 320/35 |
| 4,220,908 | 9/1980 | Nicol | 322/33 |
| 4,237,412 | 12/1980 | Rundlöf | 322/28 |
| 4,277,738 | 7/1981 | Voss | 322/99 X |
| 4,385,270 | 5/1983 | Balan et al. | 320/35 X |

Primary Examiner—R. J. Hickey
Attorney, Agent, or Firm—Paul K. Godwin, Jr.; Robert D. Sanborn

[57] ABSTRACT

A conventional voltage regulator is modified to reduce the power output from an associated alternator type generator by lowering the field current duty cycle when the ambient temperature at the voltage regulator exceeds a predetermined critical value, to thereby prevent damage to the alternator and regulator components until the ambient temperature is reduced. A temperature responsive means is connected across the field winding of the alternator and provides an override control function to the regulating section of the regulator, whenever the ambient temperature is too high. The override control causes the closed field current switch to be opened and to be held opened for a period of time that is directly related to the value of the sensed ambient temperature above the critical value.

12 Claims, 4 Drawing Figures

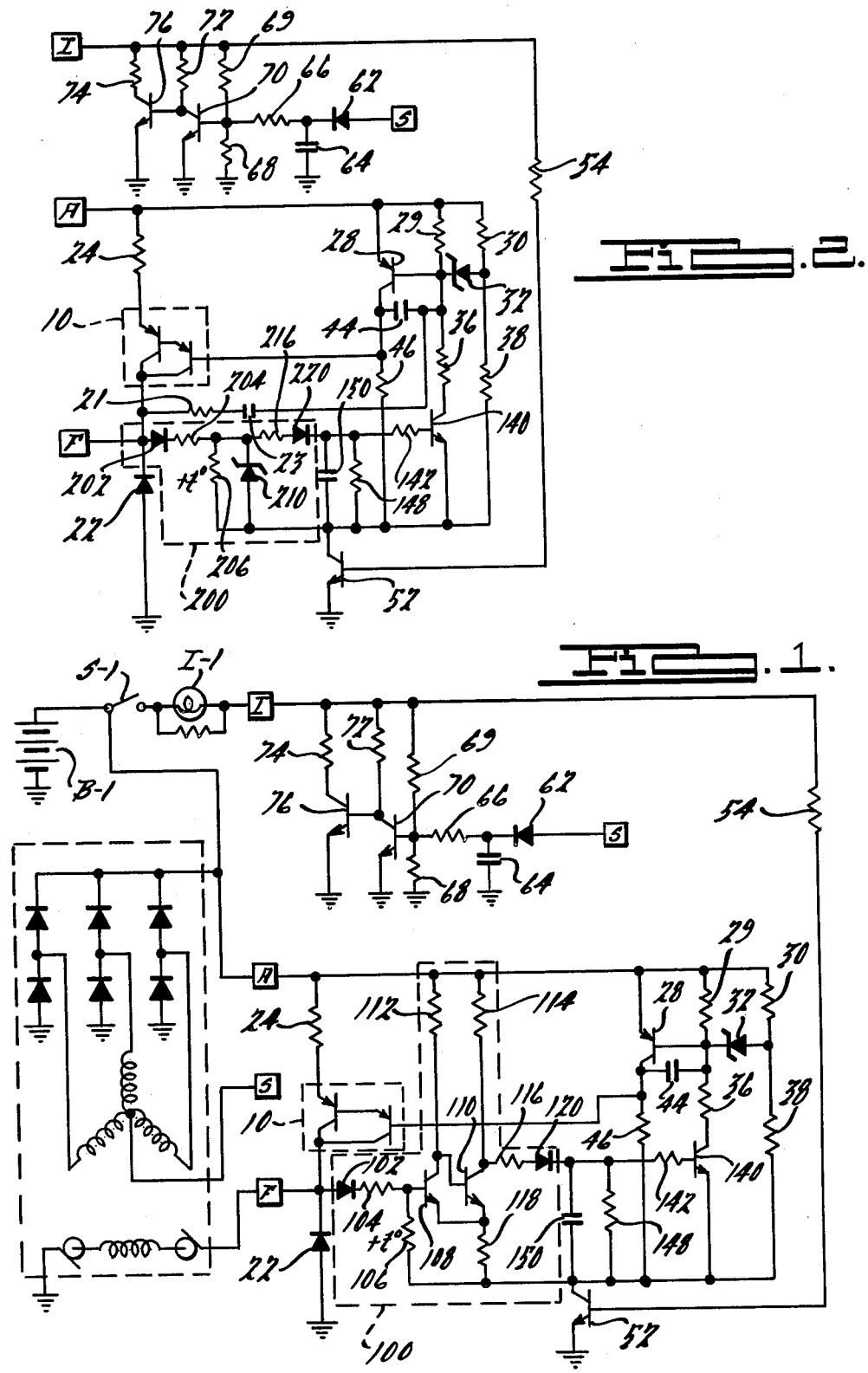

VOLTAGE REGULATOR WITH TEMPERATURE RESPONSIVE CIRCUITRY FOR REDUCING ALTERNATOR OUTPUT CURRENT

BACKGROUND OF THE INVENTION

1. Field of the Invention

The present invention is directed to the field of automotive voltage regulators for use with mechanically driven alternators and more specifically to the area of providing control of the alternator to reduce its output current at elevated temperatures.

2. Description of the Prior Art

Conventionally, vehicles with internal combustion engines employ electrical storage devices (batteries) to provide the energy necessary to start the engine and provide a limited amount of power to energize electrical accessories and lights when the engine is not running.

When the engine is started, electrical power is supplied by an electrical generator, which in recent years has been in the form of an alternator, that supplies a DC voltage sufficient to supply all the electrical requirements of the vehicle and to charge the battery. The alternator output voltage is controlled by a voltage regulator that alternately opens and closes the current path of the alternator field winding in response to the sensed voltage level present at the DC output of the alternator.

The increase in available electrical accessories on vehicles of recent years has dictated increased alternator capacity while at the same time, the smaller sized vehicles have decreased the engine compartment size and have dictated that the alternators be reduced in physical size. In addition, alternators have been recently proposed which physically mount the regulator circuitry on the alternator in order to conserve space and wiring. The increased output capacity, combined with decreased package size and decreased engine compartment size has resulted in alternators which generate more heat and which are less able to dissipate that heat. Of course, high heat is detrimental to the life of an alternator as well as an associated regulator circuitry. Besides obvious mechanical problems, which may occur, there are also numerous electrical components which may be degraded by such an environment. High heat in the alternator may cause junction breakdown of the alternator rectifier diodes. High heat in the regulator environment may cause the field current switching transistors or any other control transistors to fail and possibly cause further alternator damage. Therefore, it is most desirable to keep the alternator from overheating, and some have proposed to provide dedicated fresh air ducts to assist the dissipation.

SUMMARY OF THE INVENTION

The present invention is intended to provide an economical alternative to providing additional cooling air duct work to the alternator, as a solution to the high heat problems in vehicles.

The present invention provides a relatively inexpensive modification to a conventional voltage regulator circuit, whereby the ambient temperature in the regulator is monitored. At such time that the ambient temperature increases to a predetermined level, the present invention provides an override to the conventional regulator operation and reduces the amount of field current supplied to the alternator by increasing the field current switch off time until such time as the ambient temperature is reduced. As a result, the alternator will provide a decreased output during instances of high ambient temperature. The present invention may be implemented in several relatively inexpensive circuit configurations, such as are shown and described in the accompanying drawings.

BRIEF DESCRIPTION OF THE DRAWINGS

FIG. 1 illustrates an embodiment of the present invention configured with a Schmitt trigger circuit within an electronic voltage regulator circuit.

FIG. 2 illustrates a second embodiment of the present invention which employs a zener diode clamp as a substitute for the Schmitt trigger circuit shown in FIG. 1.

DETAILED DESCRIPTION OF THE PREFERRED EMBODIMENTS

Figure 3:
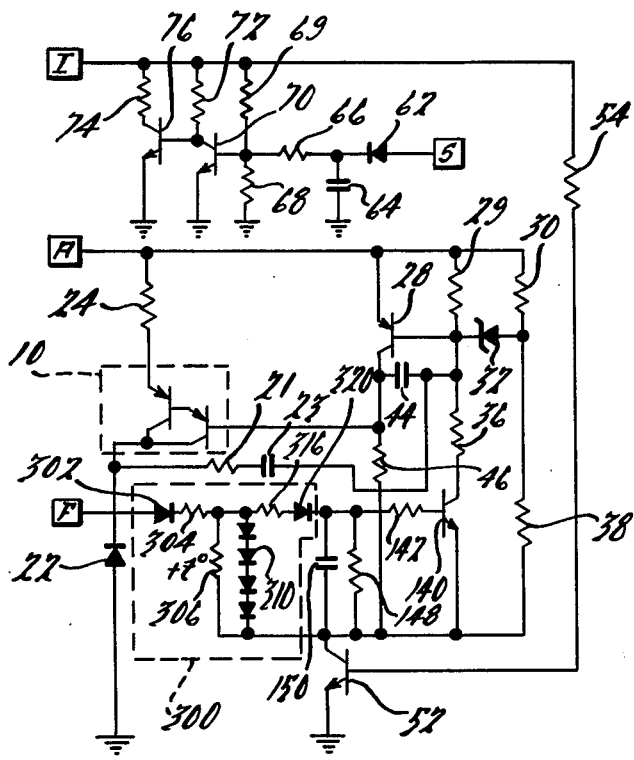
FIG. 3 illustrates a third embodiment of the present invention which employs a diode string substituted for the zener diode shown in FIG. 3.

The first embodiment of the present invention is shown in FIG. 1 in which the components of a conventional electronic voltage regulator are designated with numbers below 100 and those elements added to implement the present invention are designated with numbers above 100. The area shown within the dashed line designated as 100 respresents the portion of the present invention which is unique to this embodiment and differs somewhat from the embodiments shown in FIGS. 2 and 3, which are respectively designated as 200 and 300. The circuit in FIG. 1 will be initially described according to the interaction of the conventional regulator components. Subsequently, that portion of the circuit attributed to the present invention will be described as to its effect on the operation of the entire circuit.

FIG. 1 illustrates a conventional alternator having an output terminal A connected to a storage battery B-1 and an ignition switch S-1. The stator winding of the alternator is connected to output terminal S. The field winding is mechanically driven by an associated engine (not shown) and is electrically connected to the terminal F.

The regulator circuit has four input terminals, three of which correspond to the A, S and F terminals of the alternator and are connected directly thereto. In addition, the regulator circuit has an ignition terminal I which is connected through an indicator lamp I-1 to ignition switch S-1.

When the ignition switch S-1 is first closed, the warning light I-1 is energized by the battery voltage. Since transistor 76 is normally biased on, sufficient current flows through the resistor 74 in the collector leg of the transistor 76 to complete the circuit and cause the indicator lamp I-1 to be illuminated. Battery voltage is also applied through resistor 54 to the base of transistor 52 and biases transistor 52 to a saturated condition that turns the regulator circuit on. By turning the regulator circuit on, the field current switch 10 formed by a Darlington transistor pair is biased to a saturated condition to complete a low impedance circuit from the output of the alternator at terminal A (battery voltage initially)

through resistor 24 and to the field winding via terminal F.

As the engine is started and comes up to an initial operating speed, the engine mechanically drives the field winding of the alternator and, since current is applied to the field winding, voltage is generated in the stator windings of the alternator. Once the AC voltage level at the stator terminal S, reaches a predetermined level (approximately 6.5 volts), transistor 70 is biased from an off to a saturated condition. This causes transistor 76 to become biased in an off condition and decreases the amount of current flow through the indicator lamp $I_1$. The reduction in current through I-1 is substantial enough to extinguish the lamp. The output of the stator winding on terminal S is rectified by diode 62, filtered by capacitor 64 and dropped across a divider formed by resistors 66 and 68 to supply the biasing voltage to the transistor 70.

The voltage at A is dropped across a calibration regulating circuit formed by transistor 28, resistors 30, 38, zener diode 32 and resistor 29.

As the output of the alternator increases at terminal A, the voltage dropped across resistor 30 is regulated to a predetermined reference value defined by the emitter-base forward threshold voltage of transistor 28 and the reverse threshold voltage of zener diode 32. When the voltage at terminal A exceeds a predetermined level, the emitter-base current increases through transistor 28 and zener diode 32, thereby causing transistor 28 to become saturated. Collector current then flows through transistor 28 and resistor 46. The voltage level at the base of the control transistor in the field current switch 10 is raised with the voltage drop across resistor 46 and thereby opens the field current switch 10 and interrupts the field current applied to the alternator field winding. Consequently, the alternator output at terminal A is decreased and the transistor 28 turns off after a short delay, as determined by the decay time constant of the alternator field. At that point, the field current switch 10 is again closed to supply field current to the field winding of the alternator and thereby establishes its duty cycle. This cyclical variation of the alternator output voltage above and below the predetermined reference level continues at lower temperatures, such that the average DC voltage supplied to the vehicle electrical system is the desired system voltage.

A capacitor 44 is connected between the base and collector of transistor 28 to act as a Miller capacitor providing noise immunity for transistor 28.

The very nature of the components which make up a conventional regulator provide a limited amount of temperature compensation (on the order of 11 mv/°C). This is accomplished by means of the negative temperature coefficient properties of zener diode 32 and transistor 28. The system voltage in a conventional system varies inversely with ambient temperature primarily due to these elements. However, as can be seen from the dashed line extension of the plot in FIG. 4, conventional temperature compensation does not provide a significant reduction in output current at a critical temperature that is necessary to reduce the heat generated in the alternator and thereby prevent heat damage.

The present invention is added to a conventional regulator in order to recognize a particular ambient temperature level as being a critical level, and provide override control by reducing the field current duty cycle and thereby reducing the average amount of field current supplied to the alternator. In that manner, the amount of power dissipation in the field current switch Q10 and in the alternator output rectifier diode circuit is decreased.

The annode of diode 102 is connected to the junction between blocking diode 22 and the field current switch 10, at terminal F. The cathode of diode 102 is connected to a resistor 104. Resistor 104 forms a voltage divider with a positive temperature coefficient thermistor 106 to ground, through transistor 52 and is connected across the field winding. Whenever the field current switch 10 is closed, the voltage level at terminal F is also dropped across the voltage divider network of resistor 104 and thermistor 106. Normally, the resistance value of thermistor 106 is low enough that the voltage dropped across it is of a relatively low level. A Schmitt trigger circuit, comprising transistors 108 and 110, and resistors 112, 114 and 118 functions as a DC level sensing circuit to sense the voltage dropped across thermistor 106.

Figure 4:
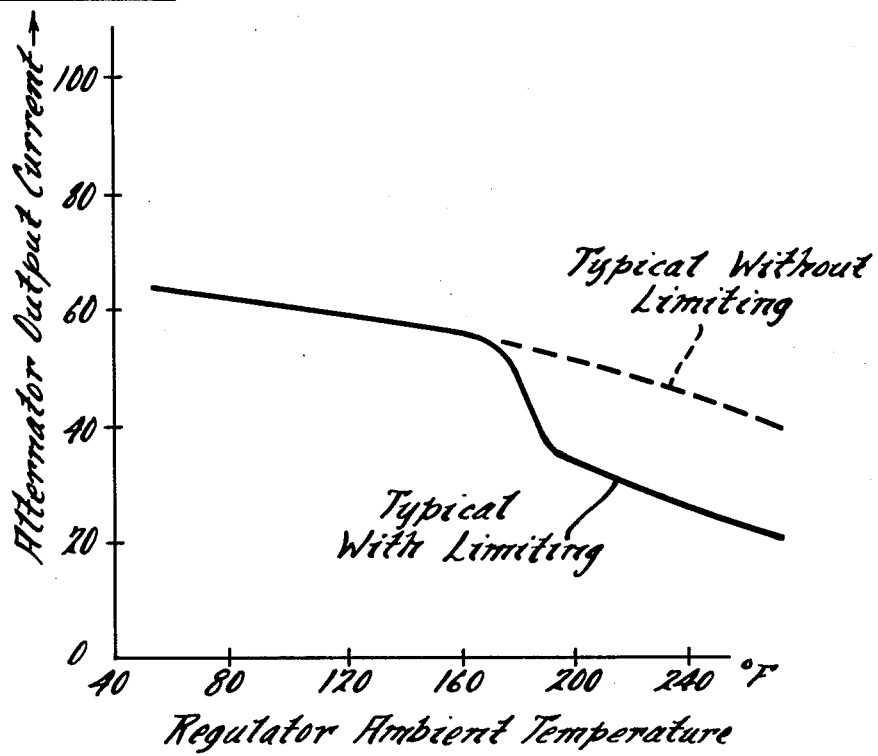
FIG. 4 is a plot of alternator output current versus regulator ambient temperature for both a conventional regulator circuit and a circuit containing the present invention.

The resistance of the thermistor 106 increases with temperature in an exponential manner once a critical or "switching" temperature has been reached. As shown in FIG. 4, the particular thermistor selected in the preferred embodiment has a switching temperature of approximately 160° F. The switching temperature is well defined and specified by the manufacturer. As the ambient temperature surrounding the thermistor 106 increases and exceeds the switching temperature, the resistance value of thermistor 106 rapidly increases. In doing so, the voltage division between resistors 104 and thermistor 106 is altered so that a higher voltage level appears across thermistor 106, proportional to its resistance. The voltage continues to increase across the thermistor 106 until it reaches a level that is sensed as sufficient to trigger the Schmitt trigger circuit. Triggering causes the transistor 108 to change from its off condition to a saturated condition and transistor 110 changes from a saturated condition to an off condition. Current then flows through resistor 116, diode 120 and charges capacitor 150 to a level equal to that dropped across resistor 148. As capacitor 150 becomes charged, transistor 140 will be biased to conduct collector-emitter current. When current in transistor 140 increases, it commands the emitter base current of transistor 28 to also increase. Use of the Schmitt trigger causes instantaneous charging of capacitor 150 and sharply defines the "turn on" time of transistor 140. When the base current of transistor 28 has reached a sufficient level, transistor 28 becomes saturated. This results in the field current switch 10 being turned off, thereby halting the supply of field current to the field winding. After the field current is halted, the capacitor 150 continues to supply charge to maintain the base-emitter current of transistor 140 for a short additional period of time, even though transistor 110 is turned back on due to the lowering of voltage at the junction between resistor 104 and thermistor 106. The time delay period for which the feild winding switch 10 is held in an off state due to the conduction of transistor 140 is determined by the amount of charge stored on capacitor 150, the values of resistors 148, 142 and the base-emitter voltage of transistor 140. When transistor 140 switches to an off state, transistor 28 will also switch to an off state allowing the field current switch 10 to return to its saturated state and reapply the field winding current to the field winding. As long as the ambient temperature level surrounding the thermistor 106 remains above the switching temperature, the Schmitt trigger circuit will continue to alter the field current duty cycle by reducing the average time that field current is applied through field current switch 10.

The use of the Schmitt trigger circuit in this preferred embodiment has been found to provide a sharply defined voltage being supplied to the base circuit of transistor 140 at the defined roll-off threshold temperature.

Of course, the results of having the present invention override the normal regulating functions of transistor 28 results in a lowering of the output voltage from the alternator and the associated current supplied to the electrical load of the vehicle.

The second embodiment of the invention is shown in FIG. 2 wherein a diode 202 has its anode connected to the field winding side of the field current switch 10 and its cathode connected to a resistor 204. The resistor 204 forms a voltage divider circuit with a positive temperature coefficient thermistor 206 which functions in the same manner as that described in FIG. 1. In this embodiment, a zener diode 210 is connected so that its cathode is connected to the junction between resistor 204 and thermistor 206 and its anode is connected to the grounded side of the thermistor 206. In this embodiment, when the ambient temperature surrounding thermistor 206 reaches the switching temperature of the thermistor 206, and its resistance value increases, the zener diode 210 will clamp the voltage level at the junction between resistor 204 and thermistor 206 at the level as dictated by the value of the selected zener diode's reverse threshold voltage. A resistor 216 is connected to the cathode of zener diode 210 and has its other end connected to the anode of diode 220. When voltage is present at the junction between resistor 204 and thermistor 206, there is a small amount of current flowing through resistor 216, diode 220 and resistor 148. That small amount of current flow supplies a small amount of charge to capacitor 150. When the voltage level at the junction between resistor 204 and thermistor 206 reaches the clamping voltage level as determined by the zener breakdown of the zener diode 210, the voltage drop across resistor 148 is sufficient to bias the transistor 140 in a conducting mode which commands transistor 28 and field current switch 10 in the same manner as described in FIG. 1. Again, when the field current switch 10 is turned off, the voltage level at the anode of diode 220 drops to zero and current flow through diode 220 ceases. The charge stored on capacitor 150 discharges through resistor 148 and after a short period of time, allows the transistor 140 to return to its non-conducting state.

A third embodiment of the invention is shown in FIG. 3, wherein a plurality of diodes 310 are series-connected to provide a clamping level voltage, such as described in FIG. 2, at the junction between a resistor 304 and a positive temperature coefficient thermistor 306. Since the forward conduction voltage drop across the diodes 310 is known, one is able to determine the approximate clamping voltage to be maintained at the junction between resistor 304 and thermistor 306. However, since the diode string 310 has a finite resistance, the voltage at the junction between resistor 304 and thermistor 306 will increase slightly even after the critical switching temperature is reached and as the resistance value of thermistor 306 continues to increase. Therefore, as the voltage drop across the diode string 310 increases, the increased voltage causes the transistor 140 to increase its conduction proportionately, resulting in a less sharply distinguished roll off voltage at the critical temperature.

In each of the three preceding embodiments, the goal of reducing the output of the alternator is achieved when the ambient temperature reaches a predetermined level, so as to prevent damage to both the regulator and the alternator by reducing the heat output of the alternator itself. In each case, when the critical temperature is reached, the positive temperature coefficient element of the voltage divider circuit provides a rapid increase in its resistance value that is sensed. An output pulse is then responsively provided to override the regulator circuit, which controls the field current switch. In that manner, the field current switch is modulated at a lower duty cycle that will effectively decrease the average current supplied to the field coil of the alternator.

It will be readily apparent that many modifications and variations may be implemented without departing from the scope of the novel concept of this invention. Therefore, it is intended by the appended claims to cover all such modifications and variations which fall within the true spirit and scope of the invention.

I claim:

1. An improved voltage regulator circuit for limiting the output of a mechanically driven alternator as a function of the ambient temperature within the voltage regulator circuit including:

switching means connected between the DC output terminal and the field winding of said alternator for closing and opening a conduction path for field current to said field winding;

means connected to said switching means and to said DC output terminal of said alternator for regulating the DC output voltage of said alternator by controlling said switching means to close said conduction path when the DC output voltage at said DC output terminal is below a predetermined voltage value and to open said conduction path when the DC output voltage is above said predetermined value;

means within said regulating means for defining said predetermined voltage value;

wherein the improvement comprises:

temperature responsive means connected across said field winding and connected to said regulating means for commanding said regulating means to control said switching means to open a closed conduction path for a time delay period when the ambient temperature within the voltage regulator circuit is above a predetermined critical value; and means within said temperature responsive means for providing a time delay period proportional to the value of the ambient temperature above the predetermined critical value.

2. A circuit as in claim 1, wherein said temperature responsive means includes a resistive voltage divider circuit connected across said field winding, wherein one resistive element of said voltage divider has a positive temperature coefficient calibrated to increase its resistance in response to increases in its ambient temperature above a predetermined level and said temperature responsive means further includes sensing means connected to said one resistive element for providing an output signal to said regulating means whenever the voltage drop across said resistive element exceeds a predetermined threshold level.

3. A circuit as in claim 2, wherein said one resistive element is a thermistor.

4. A circuit as in claim 3, wherein said sensing means includes a voltage sensitive Schmitt trigger circuit connected across said thermistor and calibrated to provide an output signal, to command said regulating means when said voltage drop across said thermistor exceeds said predetermined threshold level.

5. A circuit as in claim 3, wherein said sensing means includes a zener diode that functions to limit the voltage drop across the thermistor at the predetermined zener reverse threshold voltage and provide an output command signal to said regulating means.

6. A circuit as in claim 3, wherein said sensing means includes a plurality of series-connected forward biased diodes connected across said thermistor to limit the voltage drop across said thermistor to the conduction voltage of the series-connected diodes and provide said output command signal to said regulating means.

7. A voltage regulator circuit improved to control the output of an associated mechanically driven alternator when the ambient temperature at said regulator exceeds a predetermined value, including:

switch means connectable between the rectified output terminal and the field winding terminal of said alternator for responsively opening and closing a conduction path between said terminals;

regulating means connectable between said rectified output terminal of said alternator and said switching means for establishing a predetermined reference voltage value and controlling said switch means to close said conduction path to said field winding whenever said alternator output is below said predetermined reference value and to open said conduction path whenever said alternator output is above said predetermined reference value;

wherein said improvement comprises temperature responsive means connected to the field winding terminal side of said switch means for monitoring the ambient temperature within said regulator circuit and being connected to said regulating means for providing a command signal in said regulating means to control said switching means to open a closed conduction path when the ambient temperature within the regulator circuit exceeds a predetermined level; and means within said temperature responsive means for responsively providing a time delay to prolong said command signal as a function of said ambient temperature.

8. An improved circuit as in claim 7, wherein said temperature responsive means includes a resistive voltage divider circuit connected across said field winding, wherein one resistive element of said voltage divider has a positive temperature coefficient calibrated to increase its resistance in response to increases in ambient temperature above a predetermined level and further includes sensing means connected to said one resistive element for providing a command signal to said regulating means whenever the voltage drop across said element exceeds a predetermined level.

9. A circuit as in claim 8, wherein said one resistive element is a thermistor.

10. A circuit as in claim 9, wherein said sensing means includes a voltage sensitive Schmitt trigger circuit connected across said thermistor and calibrated to provide a command signal to said regulating means when said voltage drop across thermistor exceeds a predetermined level.

11. A circuit as in claim 9, wherein said sensing means includes a zener diode connected across said thermistor for limiting the voltage drop across said thermistor at the predetermined zener reverse threshold voltage and provide a command signal to said regulating means.

12. A circuit as in claim 9, wherein said sensing means includes a plurality of series-connected forward biased diodes connected across said thermistor to limit the voltage drop across said thermistor to the conduction voltage of the series-connected diodes and provide a command signal to said regulating means.

* * * * *